March 17, 1959
E. W. ALLEN
2,877,731
SOLDERING APPARATUS
Filed Feb. 1, 1954
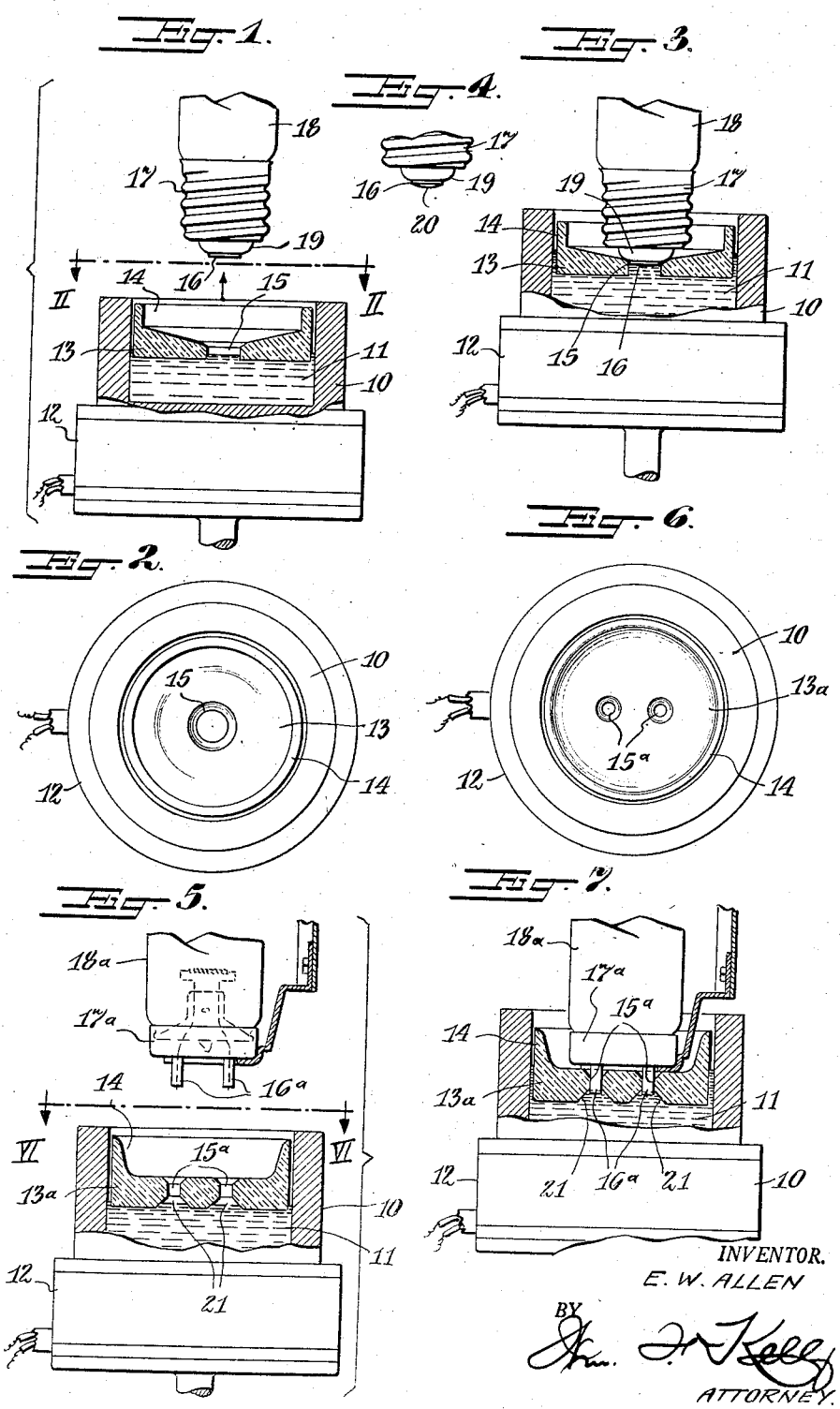
INVENTOR.
E. W. ALLEN
BY
ATTORNEY.

United States Patent Office 2,877,731
Patented Mar. 17, 1959

2,877,731

SOLDERING APPARATUS

Ernest W. Allen, Montclair, N. J., assignor to Westinghouse Electric Corporation, East Pittsburgh, Pa., a corporation of Pennsylvania Application February 1, 1954, Serial No. 407,357

5 Claims. (Cl. 113—93)

This invention relates to soldering apparatus and more particularly, to mechanism for soldering the eyelet or center terminal on the base of incandescent lamps or the tip ends of terminals in the form of lead-in pins on the bases of fluorescent lamps, and for other like uses and devices.

Various attempts have heretofore been made to apply solder, other than by hand-soldering, to terminal pins by raising a dipper full of solder thereto but has not proved to be satisfactory for soldering pins and not adaptable at all for soldering terminal eyelets for incandescent lamps the dipping of which is far more critical than with pins. The greatest difficulty encountered has been the formation of oxide on the extensive exposed surface of the molten solder in the solder pot. The oxide is lighter in weight than the solder, is somewhat fluffy, floats on the solder, will adhere but will not solder, and creates a rough protruding fringe, which, with incandescent lamps in particular, is apt to create a short circuit. One corrective attempt has been utilization of a skimmer to push the oxidized solder aside before the dipper rises out of the pot, for otherwise a coating of oxide would be lifted by the dipper. Even using a skimmer is not fully effective as the travel of the skimmer creates a motion in the solder and often some of the oxidized solder flows in from the rear or sides of the skimmer and is picked up by the dipper.

The primary objective of the present invention is to present nonoxidized solder to the terminals.

Also of general nature, the invention proposes elimination of a skimmer.

More specifically, an object of the invention is to present to the terminals a fresh surface of solder which has not had opportunity to oxidize.

The invention contemplates pumping the solder to an elevation where it will make contact with the terminals.

A further object of the invention is to limit exposure of the molten solder to air to a minimum.

Another object of the invention is to prevent the solder from going beyond the area where required.

Still another object of the invention is to provide a construction adaptable to various sizes and types of terminals.

Other objects, advantages and features of novelty will appear to persons skilled in the art to which the invention appertains as the description proceeds, both by direct recitation thereof and by implication from the context.

Referring to the accompanying drawing in which like numerals of reference indicate similar parts throughout the several views;

Figure 1 is a sectional elevation of a solder pot wherein my invention is incorporated and showing part of a screw base as used with an incandescent lamp with the terminal thereof in the location for application of solder thereto;

Figure 2 is a plan taken on line II—II of Fig. 1;

Figure 3 is a view similar to Fig. 1 and showing the solder pumped to terminal-engaging position;

Figure 4 is a fragmentary elevation of a base showing the hardened globule of solder effectively on the terminal; and Figures 5, 6 and 7 are views corresponding respectively to Figs. 1, 2, and 3, and showing the invention in connection with use for terminals such as protrude from the bases of fluorescent lamps.

In the specific embodiment of the invention illustrated in said drawing, the reference numeral 10 designates a solder pot with solder 11 therein kept in fluid or molten state by suitably applied heat, as by an electric furnace 12 contiguous to said pot. Within said pot, and shown as located coaxially thereof, is a ceramic or other float 13 the outside diameter of which is substantially the same as the inside diameter of the solder pot, merely leaving enough clearance so the float will move freely. As the float is very light in comparison to the weight of solder, it will float substantially upon the surface of the molten solder in the pot. However, as a precaution, an annular wall 14 may be provided to upstand at the periphery of said float to assure that no solder shall flow onto the top of the float inwardly from the sides thereof.

The mid-part of the float 13 is perforated agreeable to the size and location of the terminal or terminals to be soldered. In Figs. 1, 2 and 3, the perforation is shown as a hole 15 coaxial to the float and flared at its upper end. The size of the hole 15 is substantially that of the central eyelet terminal 16 at the lower end of a screw base 17 of a usual electric light bulb 18 and with the flare at the top of said hole adapted to guide the terminal into the hole and the flare engageable with the usual insulative collar to knob 19 of the lamp which electrically isolates terminal 16. Such engagement of the knob and flare confines the terminal as the only part exposed to solder through the hole, and utilizes the lamp base as a means or plug for sealing the hole against solder eruption therefrom. It will now be understood that engagement of the lamp base with the float tends to sink the float in the pool of solder, and as a consequence solder rises in said hole 15 of the float into engagement with terminal 16. This applies a globule 20 of solder upon the terminal which hardens when the lamp is removed from contact with the solder in the pool and thereby effects the desired soldering of the terminal.

Adaptation of the invention to soldering terminals of pin type is shown in Figs. 5–7, and differs from the foregoing showing merely in a variation of perforation 15a of the float 13a for accommodation of different number and character of terminals 16a as used, for instance, on the bases 17a of fluorescent lamps 18a. Since such lamps have a plurality of terminals protruding from the base, the float is provided with a like number and arrangement of holes 15a. These holes are flared at their upper ends for guiding the terminals thereinto, said holes fitting the terminals adequately to prevent the passage of solder to the upper ends of the pins and long enough to avoid contact of the pins with the solder until the float is depressed. The bottoms of the holes 15a may be flared, as at 21 as may be found desirable or necessary, to accommodate and assure entry of solder thereinto when the float is depressed so that the solder will engage the lower end of the terminals and not be prevented by surface tension and meniscus inherent in viscous fluids such as molten solder used. Contact of the liquified solder will, as mentioned above, apply a globule of solder to the lower ends of the terminals and these globules harden and perform their soldering function as the terminals are withdrawn from contact with the hot solder in the pot.

The general organization of machine for automatic utilization of the invention is of well-known indexing type which includes a suitable lamp holder 22 (see Figs. 5 and 7) which indexes from station to station and holds the lamp stationary at each station. The several views show the lamp so at the indexed station where the soldering operation is performed, and in that location the lamp terminals are directed downwardly and in oriented position above the hole or holes in the float. While the lamp is stationary at this indexed position, the machine, by suitable coordinated drive mechanism raises the solder pot to introduce the terminal or terminals into the float and to apply pressure on the float to elevate the solder as above described. Thereafter the solder pot is lowered and the indexing of the lamp proceeds.

I claim:

1. Soldering apparatus for the terminals of electric lamps comprising a solder pot for fluid solder therein, a float of refractory material within the confines of said solder pot in a substantially fixed position and closing the open end thereof to prevent the exposure of substantially the entire surface area of the fluid solder to the air with elimination of attendant undesired oxidation of said solder, and said float having a hole of a size sufficient only for the insertion therein of the terminal member to be soldered and for the elevation of the fluid solder in said hole into contact with the terminal member to solder the same, upon the application of force to the surface of said fluid solder by depression of said float therein upon the contact of said lamp therewith during soldering of said terminal member.

2. Soldering apparatus for the terminals of electric lamps comprising a solder pot for fluid solder therein, a float of a refractory material lighter than said fluid solder within the confines of said solder pot and having an area substantially equal to that of the top surface of said fluid solder and normally floating thereon in a substantially fixed position to prevent exposure of such surface to the air with elimination of attendant undesired oxidation of said solder, said float having a hole extending therethrough to the top surface of said fluid solder and of a size sufficient only for the reception of a lamp terminal to be soldered when inserted in said hole and for the elevation of fluid solder into said hole, and said float being depressible into said fluid solder to force solder upwardly in said hole and into contact with said lamp terminal to solder the latter upon slight depression of said float by the engagement of said lamp therewith during soldering of said lamp terminal.

3. Soldering apparatus for the terminals of electric lamps comprising a solder pot for fluid solder therein, a float of a refractory material lighter than said fluid solder within the confines of said solder pot and having an area substantially equal to that of the top surface of said fluid solder and normally floating thereon in a substantially fixed position and closing the end of said solder pot to prevent exposure of the top surface of said fluid solder to the air with elimination of attendant undesired oxidation of said solder, said float having a flared hole serving as a guide and extending therethrough to the top surface of said fluid solder with said hole being of a size sufficient only for the reception of a lamp terminal to be soldered when inserted in said flared hole and for the elevation of fluid solder into said hole, said float being depressible into said fluid solder to force solder upwardly in said hole and into contact with said lamp terminal to solder the latter upon slight depression of said float by engagement of said lamp therewith during soldering of said lamp terminal, and said float being provided with an upstanding peripheral flange to prevent the flow of fluid solder over the top of said float upon depression thereof.

4. Soldering apparatus for the terminals of electric lamps comprising a solder pot for fluid solder therein, a float of a refractory material lighter than said fluid solder within the confines of said solder pot and having an area substantially equal to that of the top surface of said fluid solder and normally floating thereon in a substantially fixed position and closing the end of said solder pot to prevent exposure of the top surface of said fluid solder to the air with elimination of attendant undesired oxidation of said solder, said float having a centrally disposed flared hole serving as a guide and extending therethrough to the top surface of said fluid solder with said hole being of a size sufficient only for the reception of a lamp terminal to be soldered when inserted in said flared hole and for the elevation of fluid solder into said hole, said float being depressible into said fluid solder to force solder upwardly in said centrally disposed hole and into contact with said lamp terminal to solder the latter upon slight depression of said float by engagement of said lamp therewith during soldering of said lamp terminal, and said float being provided with an upstanding peripheral flange to prevent the flow of fluid solder over the top of said float upon depression thereof.

5. Soldering apparatus for the terminals of electric lamps comprising a solder pot for fluid solder therein, a float of a refractory material lighter than said fluid solder within the confines of said solder pot and having an area substantially equal to that of the top surface of said fluid solder and normally floating thereon in a substantially fixed position and closing the end of said solder pot to prevent exposure of the top surface of said fluid solder to the air with elimination of attendant undesired oxidation of said solder, said float having a plurality of flared holes serving as guides and extending therethrough to the top surface of said fluid solder with said holes being of a size sufficient only for the reception of a lamp terminal to be soldered when inserted in each of said flared holes and for the elevation of fluid solder into each of said holes, and said float being depressible into said fluid solder to force solder upwardly in each of said flared holes and into contact with each of said lamp terminals to solder the latter upon slight depression of said float by engagement of said lamp therewith during soldering of said lamp terminal.

References Cited in the file of this patent

UNITED STATES PATENTS

| | | |
|---|---|---|
| 485,906 | Brown | Nov. 8, 1892 |
| 646,616 | Allen | Apr. 3, 1900 |
| 1,717,038 | Karmazin | June 11, 1929 |
| 1,719,512 | Krembs | July 2, 1929 |
| 2,178,158 | Aulbach | Oct. 31, 1939 |
| 2,506,047 | Thomas | May 2, 1950 |
| 2,524,297 | Quam | Oct. 3, 1950 |
| 2,578,627 | Brent | Dec. 11, 1951 |
| 2,667,138 | Maher | Jan. 26, 1954 |
| 2,673,549 | Frucki | Mar. 30, 1954 |
| 2,675,780 | McLaughlin et al. | Apr. 20, 1954 |
| 2,764,953 | Mullan | Oct. 2, 1956 |
| 2,770,875 | Zimmerman | Nov. 20, 1956 |